United States Patent
Queveau et al.

(10) Patent No.: US 7,100,963 B2
(45) Date of Patent: Sep. 5, 2006

(54) ROOF RETRACTABLE INTO THE REAR TRUNK OF A VEHICLE, AND INCLUDING MOVABLE SIDE ELEMENTS

(75) Inventors: Gérard Queveau, Le Pin (FR); Paul Queveau, Montravers (FR); Jean-Marc Guillez, Cirieres (FR)

(73) Assignee: Heuliez, Cerisay (FR)

( * ) Notice: Subject to any disclaimer, the term of this patent is extended or adjusted under 35 U.S.C. 154(b) by 0 days.

(21) Appl. No.: 11/041,896

(22) Filed: Jan. 24, 2005

(65) Prior Publication Data

US 2005/0184554 A1 Aug. 25, 2005

(30) Foreign Application Priority Data

Feb. 4, 2004 (FR) .................................. 04 50207

(51) Int. Cl.
*B60J 7/08* (2006.01)
(52) U.S. Cl. .................................................... 296/108
(58) Field of Classification Search ................ 296/108, 296/107.01, 107.08, 107.11, 107.16, 107.17–107.2
See application file for complete search history.

(56) References Cited

U.S. PATENT DOCUMENTS

| | | | | |
|---|---|---|---|---|
| 3,536,354 A | * | 10/1970 | Ingram | ........................ 296/147 |
| 5,029,932 A | * | 7/1991 | Parr | ............................ 296/108 |
| 5,520,432 A | * | 5/1996 | Gmeiner et al. | ........ 296/107.01 |
| 6,086,136 A | * | 7/2000 | Jambor et al. | .......... 296/107.17 |
| 6,419,295 B1 | * | 7/2002 | Neubrand | .............. 296/107.07 |
| 6,561,565 B1 | * | 5/2003 | Langguth et al. | ....... 296/107.04 |
| 6,715,823 B1 | * | 4/2004 | Schmitt et al. | .............. 296/225 |
| 2002/0105206 A1 | * | 8/2002 | Neubrand | .............. 296/107.07 |
| 2005/0184554 A1 | * | 8/2005 | Queveau et al. | ............. 296/108 |

FOREIGN PATENT DOCUMENTS

DE 3903358 A1 * 8/1990
FR 2 805 218 3/2000

* cited by examiner

*Primary Examiner*—H Gutman
(74) *Attorney, Agent, or Firm*—Nawrocki, Rooney & Sivertson, P.A.

(57) ABSTRACT

A retractable roof for a motor vehicle is formed from a front and rear element. An electric motor and the elements are arranged to permit the motor to drive the elements in either direction between a front position over the passenger compartment, where the elements are adjacent to each other and cover the passenger compartment, to a rear position in the rear trunk, where the elements are folded together with the front element uppermost. Hinges, between the front edge of the rear element and the rear edge of the front element and between the rear edge of the rear element and the structure of the vehicle adjacent to the front of the trunk opening, tie the elements together and permit the above element movements.

6 Claims, 5 Drawing Sheets

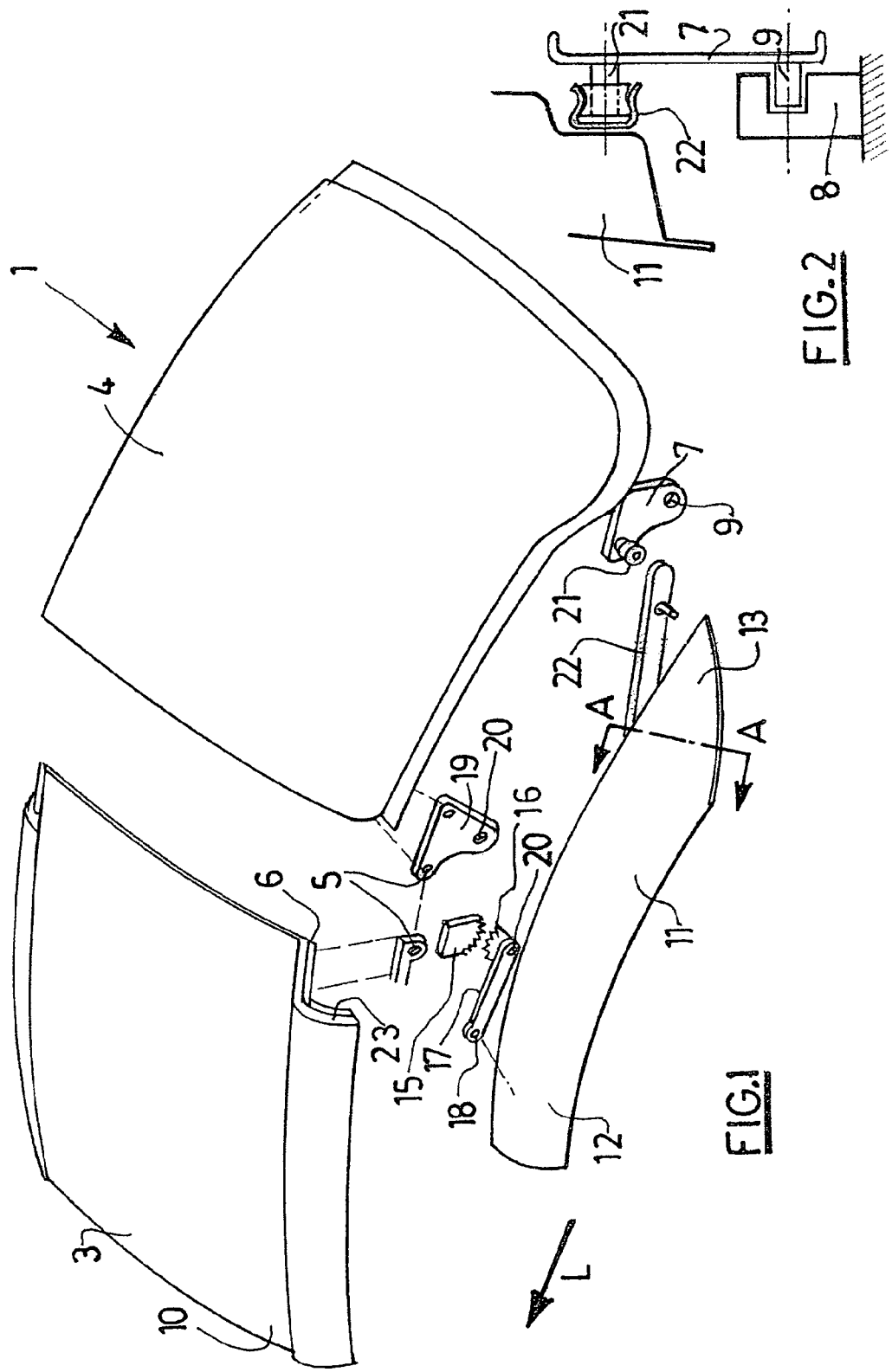

ROOF RETRACTABLE INTO THE REAR TRUNK OF A VEHICLE, AND INCLUDING MOVABLE SIDE ELEMENTS

BACKGROUND OF THE INVENTION

The invention relates to a roof retractable into the rear trunk of a vehicle.

Such a retractable roof makes it possible in particular to transform a motor vehicle of the coupe type into a vehicle of the cabriolet type.

Retractable roofs that are retractable into the rear trunk of a motor vehicle are known in particular from patents to the Applicant.

In particular, FR 2 805 218 describes a retractable roof comprising a rigid front element that is connected in hinged manner to a central rigid rear element whose rear end is hinged to the structural framework of the vehicle, and right and left side elements connected to the central rear element. In that roof, provision is made to enable the side elements to be shifted clear of the outside surface of the central rear element while said central element is moving backwards. Thus, when all of the roof elements are stowed away inside the trunk of the vehicle, a stowage height is obtained inside the trunk that is satisfactory.

SUMMARY OF THE INVENTION

Unfortunately, such an arrangement does not take account of the volume occupied by the housings protecting the rear lights of the vehicle, which housings encroach on the available volume of the trunk, when the roof is retracted inside the rear trunk.

In order to remedy that drawback, the invention provides a retractable roof in which all of its elements can be retracted satisfactorily into the trunk in spite of the presence of the housings that protect the lights, and while also leaving sufficient space available for the purposes of stowing luggage.

To this end, in a first aspect, the invention provides a retractable roof that is retractable into the rear trunk of a vehicle, said roof comprising a rigid front element that is connected in hinged manner to a central rigid rear element whose rear end is hinged to the structural framework of the vehicle, and right and left side elements whose front portions are associated with the front element and whose rear portions are associated with the central rear element, said elements being mounted to move between a first position in which they cover the passenger compartment of the vehicle, and a second position in which they are folded up inside the rear trunk, said roof further comprising first drive means for driving the side elements, which first drive means are associated with the front element, and second drive means for driving the side elements, which second drive means are associated with central rear element, said first and second drive means being arranged to enable the side elements to be shifted clear towards the front of the vehicle when the front element and the central rear element are in their second position.

By means of this arrangement, it is easy to stow the side elements in the rear trunk in spite of the presence of the housings for the lights of the vehicle.

BRIEF DESCRIPTION OF THE DRAWINGS

Other objects and advantages of the invention appear from the following description with reference to the accompanying drawings:

FIG. 1 is an exploded perspective view of the elements forming the roof of the vehicle of the invention;

FIG. 2 is a section view on A—A of FIG. 1;

DETAILED DESCRIPTION OF THE INVENTION

Figure 3:
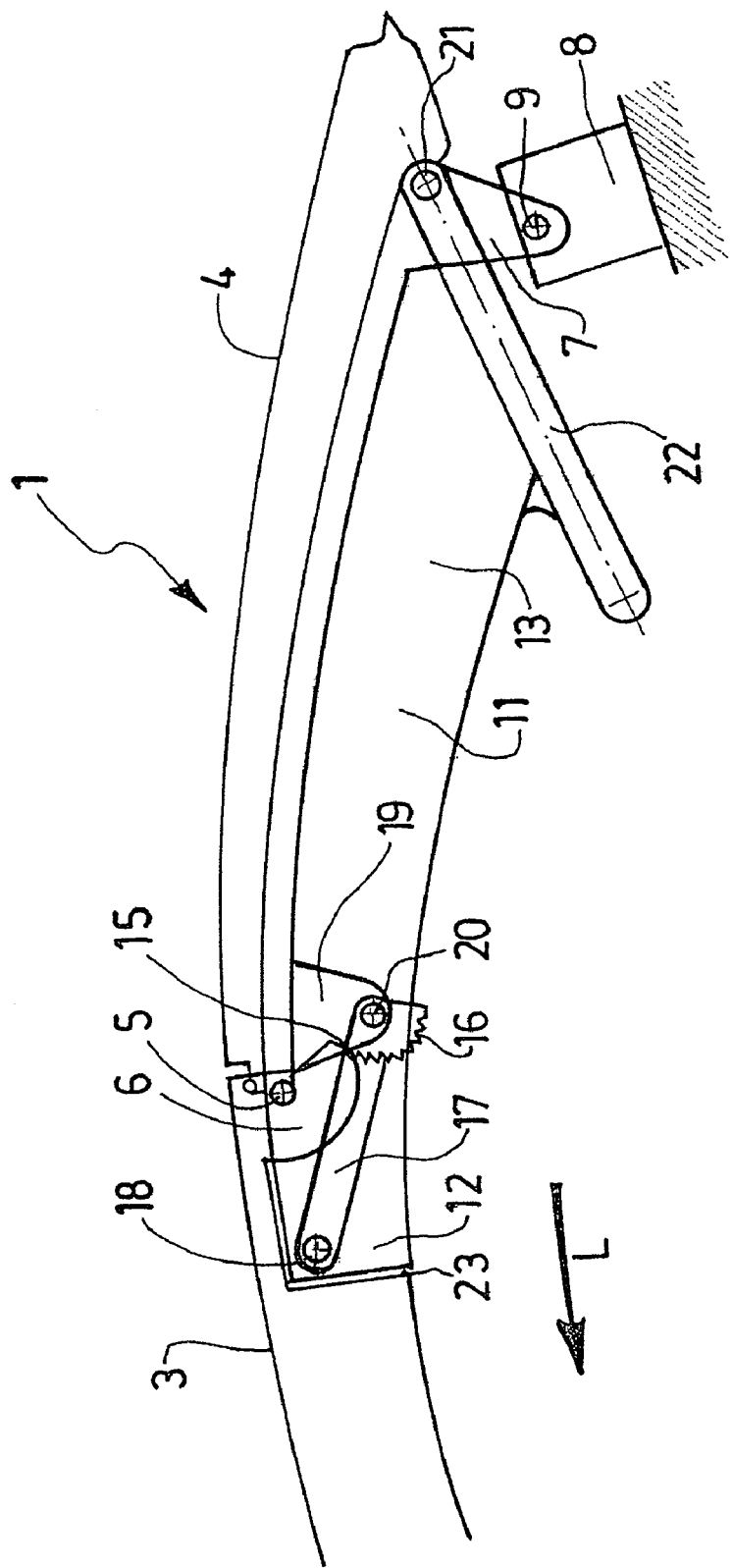
FIG. 3 is a diagrammatic longitudinal section view of the retractable roof of FIG. 1, showing the roof elements covering the passenger compartment of the vehicle.

A retractable roof 1 that is retractable into the rear trunk 2 of a motor vehicle is described below with reference to FIGS. 1 to 6.

In the description below, the terms "front", "rear", "forwards", "backwards", "right", "left", "horizontal", "longitudinal", "top", "bottom", "upwards", and "downwards" are defined relative to a vehicle that is being used.

The retractable roof 1 comprises a rigid front element 3 that is connected in hinged manner to a rigid central rear element 4. The elements are hinged together along a horizontal axis 5 that is perpendicular to the longitudinal axis L of the vehicle, and that passes through the rear bottom edge 6 of said front element 3.

The rear end 7 of the central rear element 4 is hinged to the structural framework 8 of the vehicle about a horizontal axis 9 that is perpendicular to the longitudinal axis L of the vehicle, and that passes through the rear bottom edge 7 of said central rear element.

The roof further comprises right and left side elements 11 whose front portions 12 are associated with the front element 3 and whose rear portions 13 are associated with the central rear element 4.

Said front element 3, said central rear element 4, and said side elements 11 are mounted to move between a first position in which they cover the passenger compartment of the vehicle, and a second position in which they are folded away inside the rear trunk 2, thereby causing the roof of the vehicle to go from a closed position to a fully open position.

In accordance with the invention, the roof 1 is provided with first drive means for driving the side elements 11, said first drive means being associated with the front element 3, and said roof is also provided with second drive means for driving the side elements 11, said second drive means being associated with the central rear element 4. Said first and second drive means are arranged to enable the side elements 11 to be shifted clear towards the front of the vehicle when the front element 3 and the central rear element 4 are in their second position, i.e. stowed away in the trunk 2.

Thus, when the roof 1 is retracted into the trunk 2, the side elements 11 are offset towards the front of said trunk, thereby avoiding the zone of the trunk that contains the housings 14.

The drive means for driving the side elements 11 are described below with reference to FIGS. 1 to 3, which show the left side element of the vehicle only.

In the embodiment shown, the first drive means comprise a toothed sector 15 provided on the rear bottom edge 6 of the front element 3. This toothed sector 15 is arranged to co-operate with the toothed sector 16 of a link 17 associated with the front edge 12 of the side element 11. One of the ends of the link 17 is hinged to the front edge 12 of the side element 11 about a horizontal axis 18 that is perpendicular to the longitudinal axis L of the vehicle. The opposite end of the link 17 is hinged to the front end 19 of the central rear element 4 about a horizontal axis 20 that is perpendicular to the longitudinal axis L of the vehicle.

The second drive means comprise a finger 21 provided on the rear portion 7 of the central rear element 4, which finger is arranged to co-operate with a slideway link 22 associated with the rear edge 13 of the side element 11. This portion of the roof 1 of the invention is shown on a larger scale and in section in FIG. 2.

Operation of the retractable roof of the invention is described below with reference to FIGS. 3 to 6, when said roof goes from its closed position to its open position. When the roof goes from its open position to its closed position, the movement of the roof elements is merely reversed.

When the roof 1 is in its first position, namely its closed position (FIG. 3), the front element 3 and the central rear element 4 are disposed in alignment with each other, and the side element 11 extends between the rear edge of the front element 3 and the rear edge of the central rear element 4, the front edge 12 of the side element being received against a surface 23 of the front element 3.

Such an arrangement of the front element 3, of the central rear element 4, and of the side elements 11 imparts good watertightness to the roof 1 when said roof is in the closed position.

In this position, the link 17 extends substantially longitudinally along the front portion 12 of the side element 11.

The roof 1 goes from its first position to its second position as described below with reference FIGS. 4 and 5. The central rear element 4 pivots about its pivot axis 9, and the front element 3 is also driven by an arm (not shown) hinged to the structural framework 8. When the front element 3 pivots about its pivot axis 5, the movement of the toothed sector 15 causes the toothed sector 16 of the link 17 to pivot, and therefore causes the link 17 itself to pivot upwards about its pivot axis 20.

The link 17 moving also causes the front edge of the side element 11 to pivot upwards about the pivot axis 18, thereby offsetting the side element 11 upwards relative to the front edge 19 of the central rear element 4.

The rear edge 13 of the side element 11 tilts backwards and it is held by the finger 21 provided on the central rear element 4, which finger is engaged in the slideway link 22.

Figure 4:
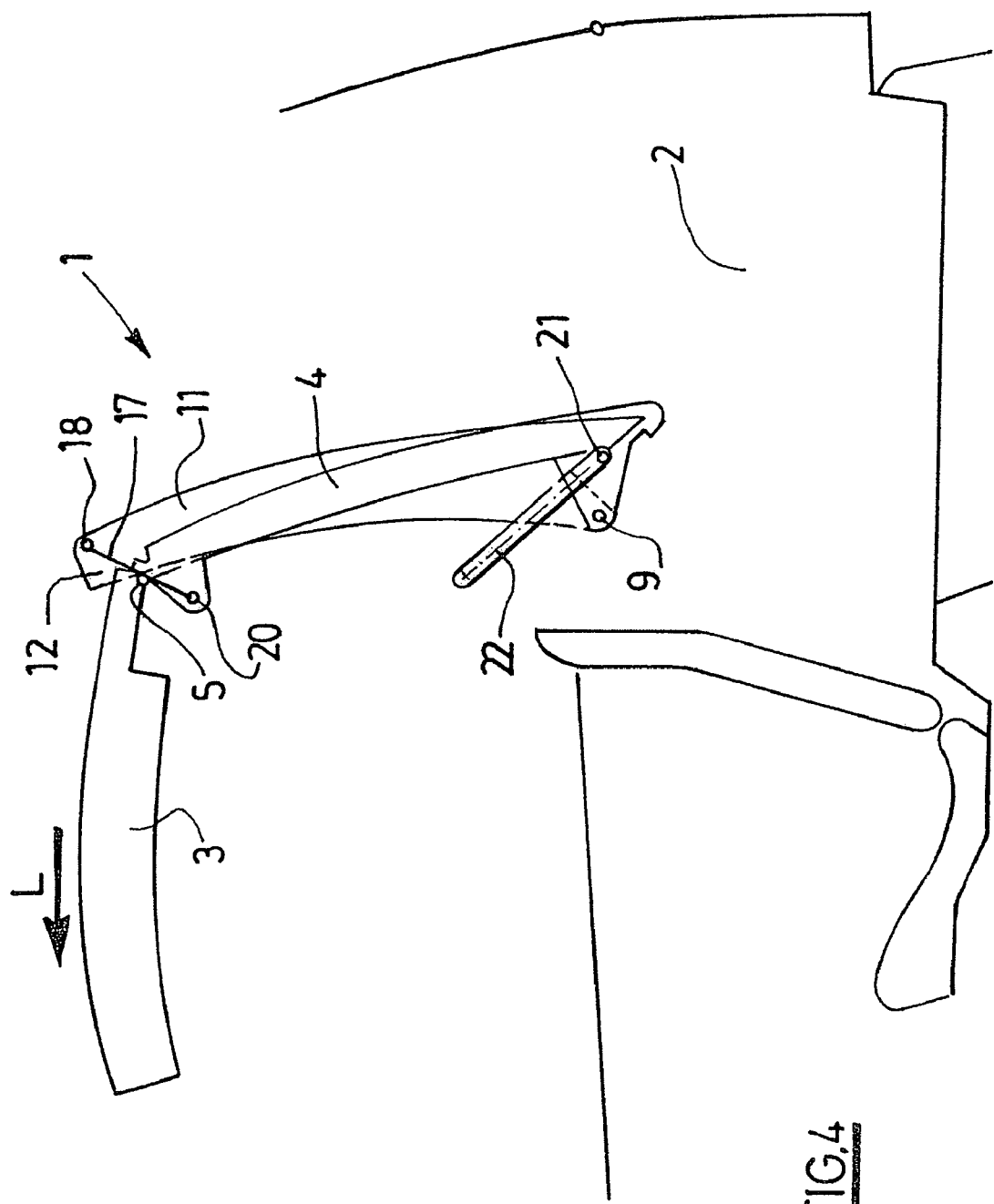
FIGS. 4 and 5 are fragmentary diagrammatic section views of a vehicle equipped with the roof of FIG. 3, showing the roof elements while they are being stowed away inside the trunk, in two successive positions.
Figure 5:
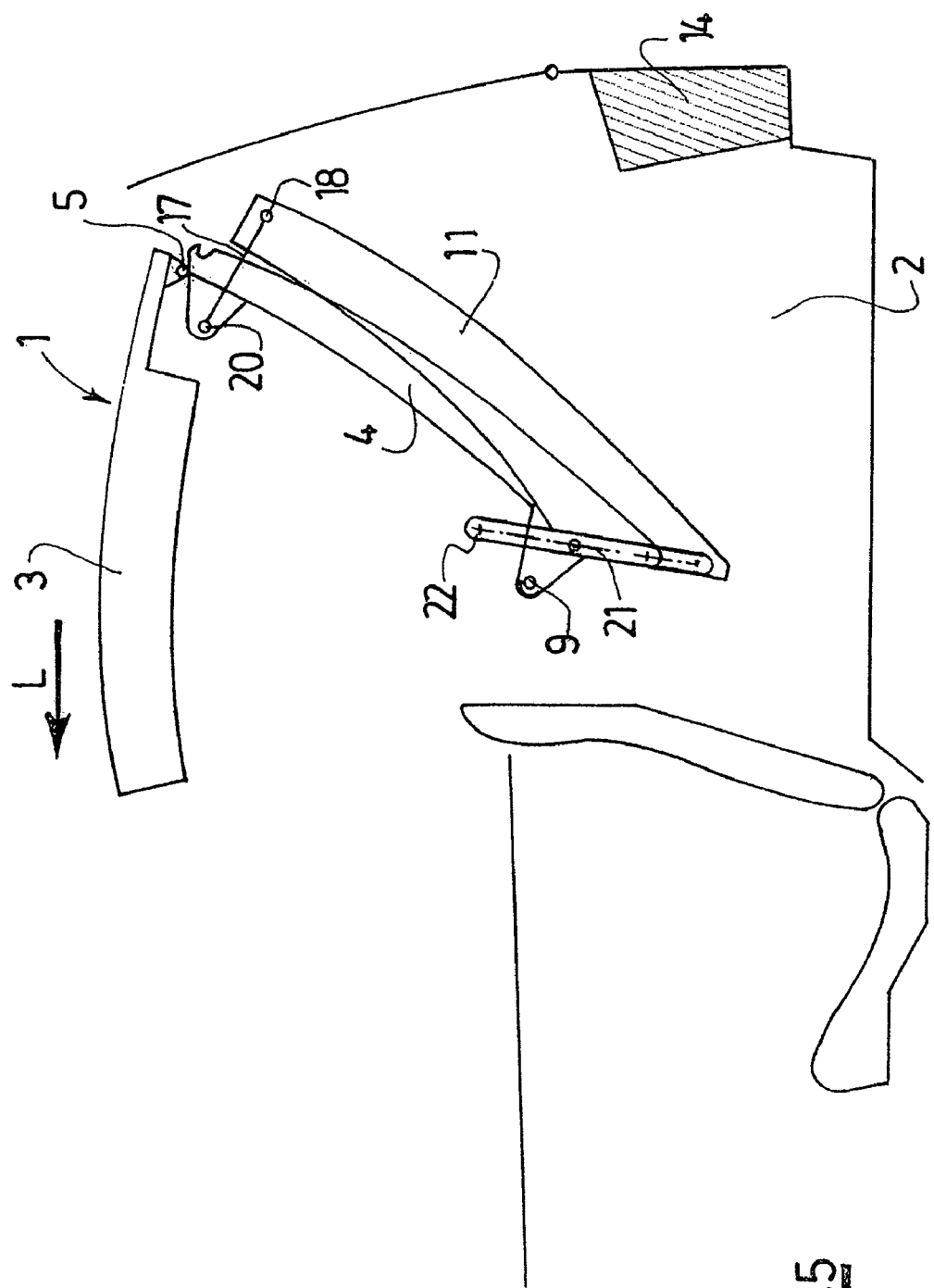
Figure 6:
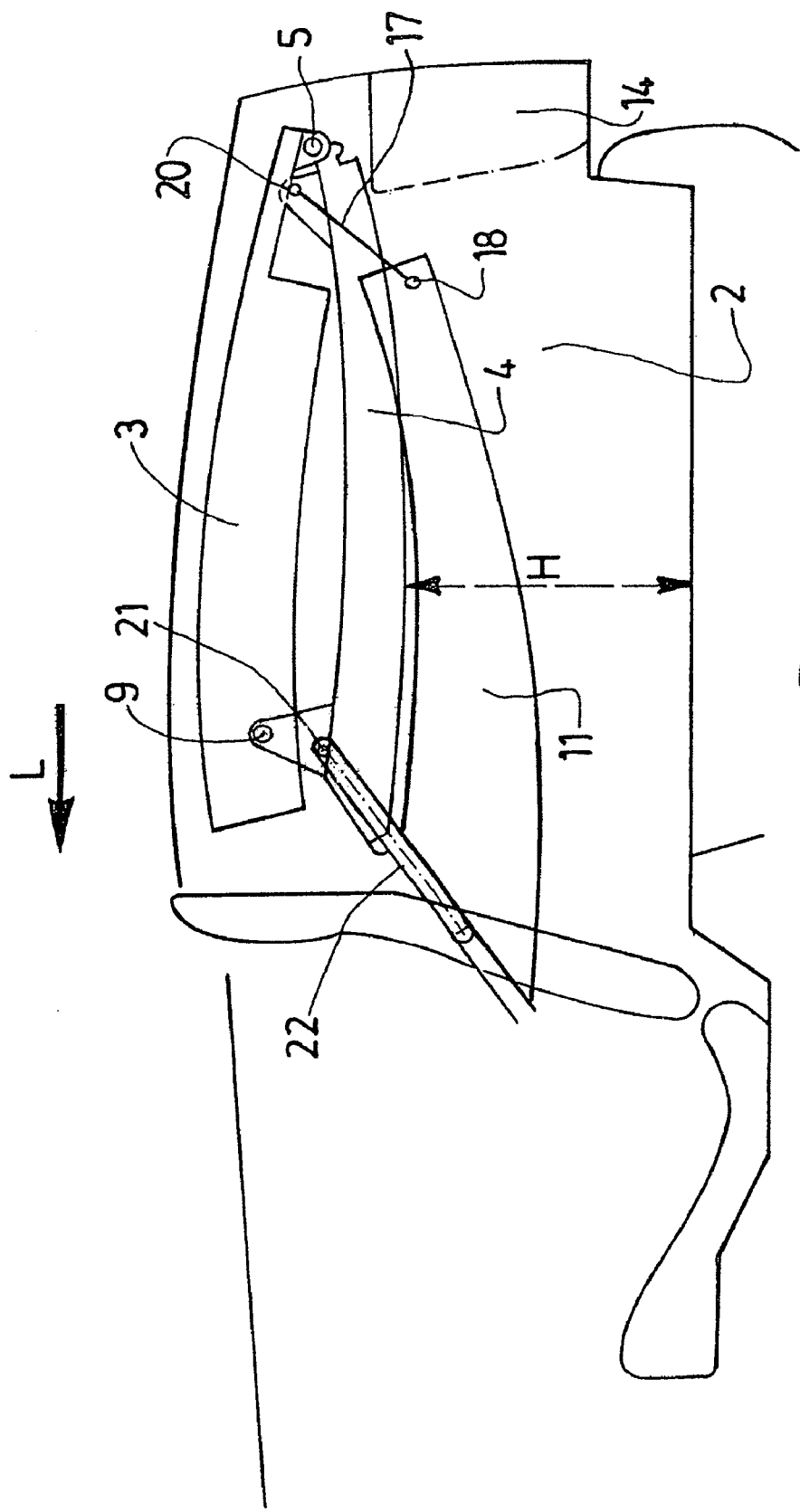
FIG. 6 is a view similar to FIGS. 4 and 5, showing the roof elements as stowed away inside the trunk.

In the intermediate position shown in FIG. 4, the side element 11 and the central rear element 4 are substantially vertical, the front element 3 being substantially perpendicular to the central rear element 4.

As the roof 1 tilts backwards (FIG. 5), the link 17 causes the side element 11 to be offset backwards relative to the central rear element 4, the side element 11 still being guided and held via its slideway link co-operating with the finger 21.

When the roof 1 is in its second position, i.e. when all of its elements are stowed away in the rear trunk 2 (FIG. 6), the side element 11 is thus shifted clear towards the front of the vehicle, and offset downwards relative to the front element 3 and to the central rear element 4, which are folded up one on the other.

Recesses can be provided on either side of the seats that serve to receive and to mask the portions of the side elements 11 that project from the trunk, in this position.

The roof of the invention thus offers the advantage of being capable of being retracted into the rear trunk while avoiding the volumes occupied by the housings of the lights of the vehicle, while also preserving a stowage height H that is satisfactory in said trunk.

The invention claimed is:

1. A retractable roof that is retractable into the rear trunk of a vehicle, said roof comprising a rigid front element that is connected in hinged manner to a central rigid rear element whose rear end is hinged to the structural framework of the vehicle, and right and left side elements whose front portions are associated with the front element and whose rear portions are associated with the central rear element, said elements being mounted to move between a first position in which they cover the passenger compartment of the vehicle, and a second position in which they are folded up inside the rear trunk, said roof being characterized in that it further comprises first drive means for driving the side elements, said first drive means are associated with the front element, and second drive means for driving the side elements, said second drive means are associated with the central rear element, said first and second drive means being arranged to enable the side elements to be shifted clear towards the front of the vehicle when the front element and the central rear element are in their second position.

2. A roof according to claim 1, characterized in that the front element is hinged to the central rear element about a first horizontal axis that is perpendicular to the longitudinal axis (L) of the vehicle, said first horizontal axis passing through the rear bottom edge of said front element.

3. A roof according to claim 2, characterized in that the central rear element is hinged to the structural framework about a second horizontal axis that is perpendicular to the longitudinal axis (L) of the vehicle, said second horizontal axis passing through the rear bottom edge of said central rear element.

4. A roof according to claim 1, characterized in that the first drive means comprise a toothed sector provided on the rear bottom edge of the front element, and arranged to co-operate with the toothed sector of a link associated with the front portion of one said side element.

5. A roof according to claim 4, characterized in that one of the ends of the link is hinged to the front portion of the one said side element about a front horizontal axis that is perpendicular to the longitudinal axis (L) of the vehicle, the other end of the link being hinged to a front edge of the central rear element about a rear horizontal axis that is perpendicular to the longitudinal axis (L) of the vehicle.

6. A roof according to claim 1, characterized in that the second drive means comprise a finger provided on the rear end of the central rear element, said finger being arranged to co-operate with a slideway link associated with the rear portion of one said side element.

* * * * *